United States Patent
Kazerouni et al.

(10) Patent No.: US 11,860,972 B2
(45) Date of Patent: Jan. 2, 2024

(54) SEQUENTIAL HYPOTHESIS TESTING IN A DIGITAL MEDIUM ENVIRONMENT USING CONTINUOUS DATA

(71) Applicant: Adobe Inc., San Jose, CA (US)

(72) Inventors: Abbas Kazerouni, Palo Alto, CA (US); Mohammad Ghavamzadeh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 213 days.

(21) Appl. No.: 17/211,310

(22) Filed: Mar. 24, 2021

(65) Prior Publication Data
US 2021/0209195 A1 Jul. 8, 2021

Related U.S. Application Data

(62) Division of application No. 15/347,311, filed on Nov. 9, 2016, now Pat. No. 11,042,603.

(51) Int. Cl.
| | |
|---|---|
| *G06F 17/18* | (2006.01) |
| *G06Q 30/0241* | (2023.01) |
| *G06Q 30/0242* | (2023.01) |
| *G06F 111/10* | (2020.01) |

(52) U.S. Cl.
CPC ......... *G06F 17/18* (2013.01); *G06Q 30/0241* (2013.01); *G06Q 30/0242* (2013.01); *G06F 2111/10* (2020.01)

(58) Field of Classification Search
CPC ................................. G06F 30/20; G06F 17/18
See application file for complete search history.

(56) References Cited

U.S. PATENT DOCUMENTS

| | | | |
|---|---|---|---|
| 2012/0254333 A1 | 10/2012 | Chandramouli et al. | |
| 2014/0108324 A1* | 4/2014 | Chen | G06F 17/16 706/52 |
| 2015/0234955 A1* | 8/2015 | Joshi | G06F 30/20 703/2 |
| 2017/0083429 A1* | 3/2017 | Pekelis | G06F 11/3612 |
| 2018/0129760 A1 | 5/2018 | Kazerouni et al. | |

(Continued)

OTHER PUBLICATIONS

"Non-Final Office Action", U.S. Appl. No. 15/347,311, dated Nov. 13, 2020, 19 pages.

(Continued)

*Primary Examiner* — Bijan Mapar
(74) *Attorney, Agent, or Firm* — FIG. 1 Patents

(57) ABSTRACT

Sequential hypothesis testing in a digital medium environment is described using continuous data. To begin, a model is received that defines at least one data distribution. Testing data is also received that describes an effect of user interactions with the plurality of options of digital content on achieving an action using continuous non-binary data. Values of parameters of the model are then estimated for each option of the plurality of options based on the testing data. In one example. A variance estimate is then generated based on the estimated values of the parameters of the model for each option of the plurality of options. From this, a determination is made as to a decision boundary based on the variance estimate and an estimate for a mean value of each option of the plurality of options based on the testing data.

20 Claims, 9 Drawing Sheets

(56) References Cited

U.S. PATENT DOCUMENTS

2018/0341975 A1    11/2018  Fellows

OTHER PUBLICATIONS

"Notice of Allowance", U.S. Appl. No. 15/347,311, dated Mar. 18, 2021, 7 pages.
"Pre-Interview First Office Action", U.S. Appl. No. 15/347,311, dated Jun. 24, 2020, 15 pages.
"Restriction Requirement", U.S. Appl. No. 15/347,311, dated Jan. 13, 2020, 6 pages.

* cited by examiner

400

402
Generate an ensemble model as including a plurality of sub-models based on distributions of the effect of the user interactions described by historical data, the historical data describing an effect of user interactions with the plurality of options of digital content on achieving the action using continuous non-binary data

404
Control sequential hypothesis testing of an effect of the plurality of options on achieving the action in testing data based on the ensemble model

---

Algorithm 1 Parametric Method

Input: $\alpha, N_{max}, \tau$
Warm Up: get the data $\mathcal{D}_A, \mathcal{D}_B$
while $n_A + n_B \leq N_{max}$ do
   Observe the new data and update data sets $\mathcal{D}_A, \mathcal{D}_B$
   Compute empirical means $$\hat{m}_A = \frac{1}{n_A} \sum_{X \in \mathcal{D}_A} X, \qquad \hat{m}_B = \frac{1}{n_B} \sum_{Y \in \mathcal{D}_B} X$$

Compute ML estimates $(\hat{p}_A, \hat{\mu}_A, \hat{\sigma}_A^2) = ML(\mathcal{D}_A)$ and $(\hat{p}_B, \hat{\mu}_B, \hat{\sigma}_B^2) = ML(\mathcal{D}_B)$ Compute the plug-in variances $$\hat{v}_A = (1 - \hat{p}_A)\left(e^{\hat{\sigma}_A^2} - 1\right)e^{2\hat{\mu}_A + \hat{\sigma}_A^2}, \quad \hat{v}_B = (1 - \hat{p}_B)\left(e^{\hat{\sigma}_B^2} - 1\right)e^{2\hat{\mu}_B + \hat{\sigma}_B^2}$$

Let $\theta = |\hat{m}_A - \hat{m}_B|$ and $\hat{V} = \frac{\hat{v}_A}{n_A} + \frac{\hat{v}_B}{n_B}$
   if $\theta > \sqrt{\left(2\log\frac{1}{\alpha} - \log\frac{\hat{V}}{\hat{V}+\tau}\right)\frac{\hat{V}(\hat{V}+\tau)}{\tau}}$ then
     Reject the null hypothesis and STOP
   end if
end while
Accept the null hypothesis if is is not being rejected yet

*Fig. 8*

SEQUENTIAL HYPOTHESIS TESTING IN A DIGITAL MEDIUM ENVIRONMENT USING CONTINUOUS DATA

RELATED APPLICATIONS

This application claims priority as a divisional of U.S. patent application Ser. No. 15/347,311, filed Nov. 9, 2016, and titled "Sequential Hypothesis Testing in a Digital Medium Environment using Continuous Data," the entire disclosure of which is hereby incorporated by reference.

BACKGROUND

In digital medium environments, service provider systems strive to provide digital content that is of interest to consumers. An example of this is digital content used in a marketing context to increase a likelihood of conversion of a product or service. Examples of conversion include interaction of a consumer with the digital content (e.g., a "click-through"), purchase of a product or service that pertains to the digital content, and so forth. A consumer, for instance, may navigate through webpages of a website of a service provider system. During this navigation, the consumer is exposed to an advertisement relating to the product or service. If the advertisement is of interest to the consumer, the consumer may select the advertisement through interaction with a computing device to navigate to webpages that contain more information about the product or service that is a subject of the advertisement, functionality usable to purchase the product or service, and so forth. Each of these selections thus involves conversion of interaction of the consumer via the computing device with respective digital content into other interactions with other digital content and/or even purchase of the product or service. Thus, configuration of the advertisements in a manner that is likely to be of interest to the consumers increases the likelihood of conversion of the consumers regarding the product or service.

In another example of digital content and conversion, a consumer may agree to receive emails or other electronic messages relating to products or services provided by the service provider system. The consumer, for instance, may opt-in to receive emails of marketing campaigns corresponding to a particular brand of product or service. Likewise, success in conversion of the consumers towards the product or service that is a subject of the emails directly depends on interaction of the consumers with the emails. Since this interaction is closely tied to a level of interest the consumer has with the emails, configuration of the emails also increases the likelihood of conversion of the consumers regarding the product or service.

Unique to advertising in the digital environment, the ability to digitally deliver targeted digital marketing content also allows an advertiser to instantaneously collect data regarding the consumer's interaction with the advertisement, and thus infer the success of the digital marketing content. To do so, testing techniques have been developed for a computing device to determine a likelihood of which options (e.g., items of digital content) are of interest to consumers and thus promote achievement of an action, e.g., conversion. An example of this is A/B testing, which involves comparison of two or more options, e.g., a baseline digital content option "A" and an alternative digital content option "B." In a digital marketing scenario, the two options include different digital marketing content such as advertisements having different offers, e.g., digital content option "A" may specify 20% off this weekend and digital content option "B" may specify buy one/get one free today.

Digital content options "A" and "B" are then provided to different sets of consumers, e.g., using advertisements on a webpage, emails, and so on. Testing may then be performed by a computing device through use of a hypothesis. Hypothesis testing involves testing validity of a claim (i.e., a null hypothesis) by a computing device that is made about a population to reject or prove the claim. For example, a null hypothesis "$H_0$" may be defined in which conversion caused by the baseline (e.g., option "A") is equal to a conversion caused by the alternative (e.g., option "B"), i.e., "$H_0$:A=B". An alternative hypothesis "$H_1$" is also defined in which the conversion caused by the baseline is not equal to the conversion caused by the alternative, i.e., "$H_1$:A≠B."

Based on the response from these consumers, a determination is made by the computing device to reject or not reject the null hypothesis. Rejection of the null hypothesis by the computing device indicates that a difference has been observed between the options, i.e., the null hypothesis that both options are equal is wrong. This rejection considers accuracy guarantees that Type I and/or Type II errors are minimized within a defined level of confidence, e.g., to ninety-five percent confidence that these errors do not occur. A Type I error "$\alpha$" is the probability of rejecting the null hypothesis when it is in fact correct, i.e., a "false positive." A Type II error "$\beta$" is the probability of not rejecting the null hypothesis when it is in fact incorrect, i.e., a "false negative." From this, a determination is made as to which of the digital content options are the "winner" based on a desired metric, e.g., conversion.

A common form of conventional digital marketing A/B testing is referred to as fixed-horizon hypothesis testing. In fixed-horizon hypothesis testing, inputs are provided by a user, and the test is then "run" over a defined number of samples (i.e., the "horizon") until it is completed. These inputs include a confidence level that refers to the probability of correctly accepting the null hypothesis, e.g., "1−Type I error" which is equal to "1−$\alpha$". The inputs also include a power (i.e., statistical power) that defines a sensitivity in a hypothesis test that the test correctly rejects the null hypothesis, e.g., a false negative which may be defined "1−Type II error" which is equal to "1−$\beta$". The inputs further include a baseline conversion rate (e.g., "$\mu_A$") which is the metric being tested in this example. A minimum detectable effect (MDE) is also entered as an input that defines a "lift" that can be detected with the specified power and defines a desirable degree of insensitivity as part of calculation of the confidence level. Lift is formally defined based on the baseline conversion rate as "$|\mu_B - \mu_A|/\mu_A$."

From these inputs, a horizon "N" is calculated that specifies a sample size per option (e.g., a number of consumers per digital content options "A" or "B") required to detect the specified lift of the minimum detectable effect with the specified power. Based on this horizon "N", the number "N" samples are collected (e.g., visitors per offer) and the null hypothesis $H_0$ is rejected if "$\Lambda_N \geq \gamma$," where "$\Lambda N$" is the statistic being tested at time "N" and "$\gamma$" is a decision boundary that is used to define the "winner" subject to the confidence level.

Fixed-horizon hypothesis testing has several drawbacks. In a first example drawback, a user that configures the test is forced to commit to a set amount of the minimum detectable effect before the test is run. Further, this commitment may not be changed as the test is run. However, if such a minimal detectable effect is overestimated, this test procedure is inaccurate in the sense that it possesses a significant risk of missing smaller improvements. If underestimated, this testing is data-inefficient because a greater amount of time may be consumed to process additional samples to determine significance of the results.

In a second example drawback, fixed-horizon hypothesis testing is required to run until the horizon "N" is met, e.g., a set number of samples is collected and tested. To do otherwise introduces errors, such as to violate a guarantee against Type I errors. For example, as the test is run, the results may fluctuate above and below a decision boundary that is used to reject a null hypothesis. Accordingly, a user that stops the test in response to these fluctuations before reaching the horizon "N" may violate a Type I error guarantee, e.g., a guarantee that at least a set amount of the calculated statistics does not include false positives. Accordingly, there is also a need for testing techniques that may be performed with increased efficiency and accuracy that may support real time feedback which is not possible using conventional fixed horizon testing techniques.

Additionally, conventional techniques of the A/B testing used by digital marketing systems are typically limited to use of binary data. An example of this is conversion, which describes whether respective consumers did or did not convert, e.g., purchase a good or service, select an advertisement, and so forth. Thus, binary data is bounded between zero and one and follows a known Bernoulli distribution, the properties of which are then leveraged to perform testing.

In some instances, however, data being tested is continuous and non-binary, such as through use of monetary values, conversion rates, and so forth to describe an effect of user interactions on achieving an action, e.g., conversion. As a result, continuous data typically does not follow a known distribution (e.g., Bernoulli or Gaussian) and may be unbounded, e.g., monetary values. Thus, testing of continuous data is difficult to perform accurately due to lack of knowledge regarding which distribution is actually followed by the continuous data. Although some conventional techniques have been developed to test continuous data, these conventional techniques typically also rely on a Bernoulli or Gaussian distribution and thus may be prone to error because a distribution that is actually followed by the continuous data may depart from this distribution. As a result, assumptions made based on this distribution to perform the test are also in error.

SUMMARY

To overcome these problems, sequential hypothesis testing is employed in a digital medium environment to efficiently test an effect of digital content on achieving an action. An example of this is to identify the most successful digital marketing content in a digital marketing environment where the customer interaction with the digital marketing content results in continuous and non-binary data. To do so, a model is used to define a data distribution. The model, for instance, may be configured as an ensemble (e.g., mixture) model formed from a plurality of sub-models, examples of which include a log normal distribution and a mass-at-zero distribution.

Testing data is received that describes an effect of user interactions with the plurality of options of digital content on achieving an action using continuous non-binary data, e.g., monetary amounts on conversion. Values of parameters of the model are then estimated for each option of the plurality of options in a warm-up phase of pre-specified length and based on the sequentially arriving test data. In one example, this is performed using a maximum likelihood estimation (MLE) technique by finding the values of the parameters that maximize a likelihood of achieving the effect of the action. A variance estimate is then generated based on the estimated values of the parameters of the model for each option of the plurality of options.

From this, a determination is made as to a decision boundary based on the variance estimate and an estimate for a mean value of each option of the plurality of options based on the testing data. The estimate for the mean value may be generated by the testing system using an empirical method, i.e., the average of values observed for each option is an estimate for the mean value of that option.

Sequential hypothesis testing of the effect of the plurality of options on achieving the action in the testing data is then controlled based on the decision boundary. This permits the sequential hypothesis testing technique to conclude as soon as a decision boundary is reached and a "winner" declared, without forcing a user to wait until the horizon "N" of a number of samples is reached. This also permits a user to "peek" into the test to monitor the test in real time as it is being run, without affecting the accuracy of the test. Flexible execution is also made possible in that the test may continue to run even if initial accuracy guarantees have been met, such as to obtain higher levels of accuracy, and even permits users to change parameters used to perform the test in real time as the test is performed.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 4 is a flow diagram depicting a procedure in an example implementation in which at least one model is identified through comparison with historical data to generate a decision boundary used as part of sequential hypothesis testing

FIG. 8 depicts an example parametric technique for performing sequential hypothesis testing.

DETAILED DESCRIPTION

Overview

Figure 1:
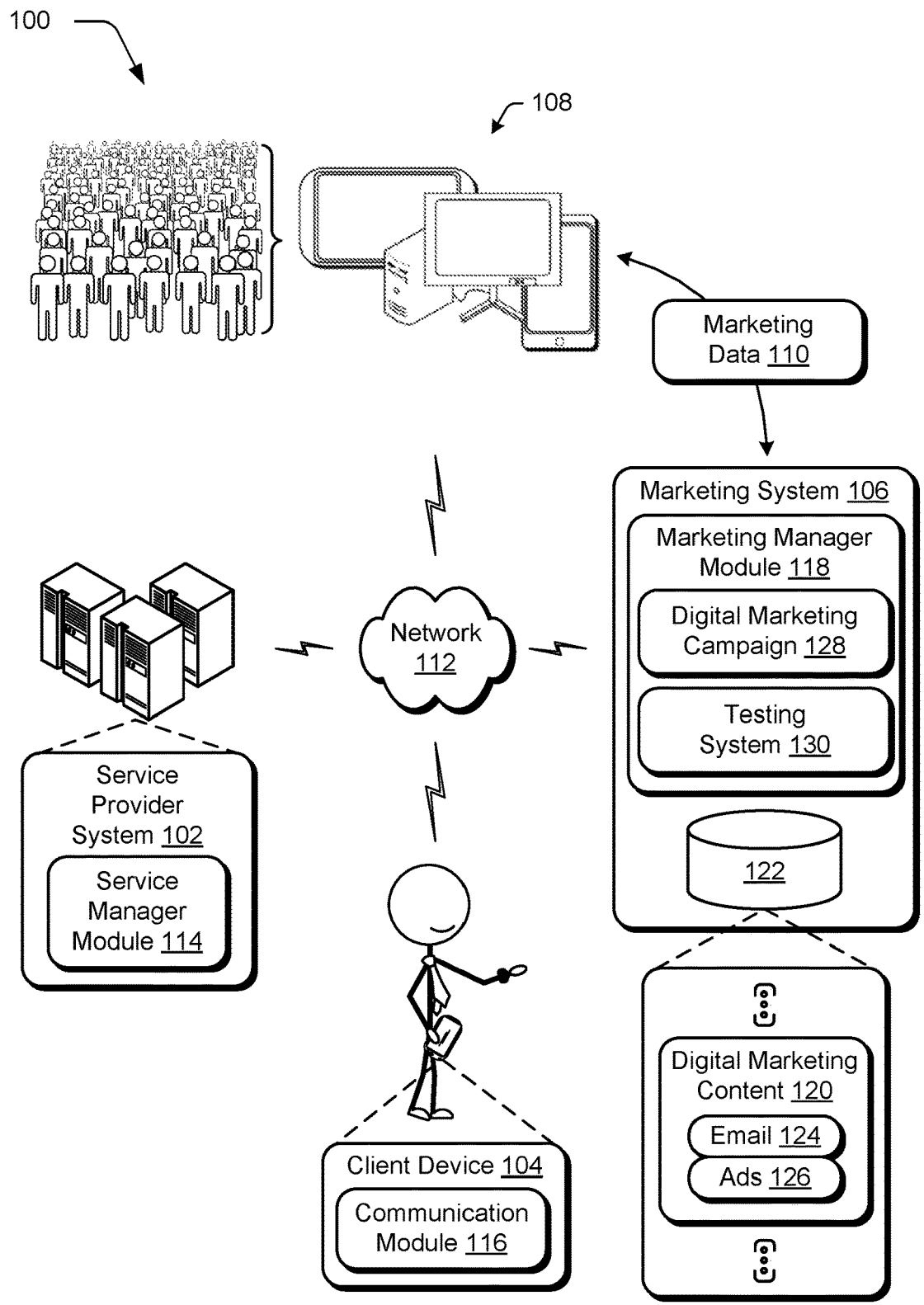
FIG. 1 is an illustration of an environment in an example implementation that is operable to employ techniques described herein.

Testing is used to compare different options (e.g., items of digital content) against each other to determine which of the different options operate "best" as defined by a statistic in achieving a desired action. In a digital marketing scenario, this statistic includes a determination as to which item of digital marketing content exhibits a greatest effect on conversion. This is not possible in conventional non-digital marketing techniques in which data is not available regarding an effect of options on conversion. Examples of conversion include interaction of a user with digital marketing content (e.g., a "click-through" of an advertisement), purchase of a product or service that pertains to the digital marketing content, and so forth.

Conventional A/B testing techniques typically employ binary data to describe a desired action, such as whether a user did or did not convert after exposure to a particular option. This binary data is thus bounded (e.g., between one and zero) and follows a known parametric model to describe observations in this data, e.g., user interactions with digital content through use of a Bernoulli or Gaussian distribution. This model is then used as a basis to determine a result of the testing using statistical techniques (e.g., distributions of the observations described using the models), and as such the model provides an underlying basis in the accuracy of the testing.

However, continuous non-binary data observed in real life scenarios may not follow this model. Continuous non-binary data, for instance, may describe conversion through use of monetary values, conversion rates, and so forth. Accordingly, continuous non-binary data may not be bounded in certain instances (e.g., monetary values) or may fail to follow distributions typically exhibited by binary data, e.g., Bernoulli or Gaussian distributions in the example above. Therefore, conventional techniques that test continuous non-binary data may lack accuracy and are prone to errors when following assumptions exhibited by binary data, such as Bernoulli or Gaussian distributions and bounding.

Accordingly, testing techniques are described for continuous data. In a first example, the testing techniques are configured for use by a computing device to identify a type of distribution exhibited by data being tested and then control testing based on this distribution. Historical data, for instance, may be collected. From this historical data, a distribution may be identified that is exhibited by this data as a model of observations (e.g., user interactions) of the historical data.

Identification of the distribution may be performed automatically through comparison of a variety of distributions described by models (e.g., parametric models) with historical data to find which models "fit" the historical data. This may be performed automatically by a computing device or manually through user interaction with a user interface, e.g., to select models based on a distribution of the historical data displayed in the user interface.

In one example, an ensemble model (i.e., mixture model) is generated to describe the distribution as a combination of a plurality of sub-models, such as a log normal distribution (e.g., to model users that converted) and a mass-at-zero distribution (e.g., to model users that did not convert) as further described below. The model is then used by the computing device to test an effect of subsequent options on achieving an action that is measurable by a metric, such as through use of subsequent testing data to test an effect of options described in the testing data on achievement of an action such as conversion. In this way, continuous data may be tested that departs from previous assumptions made regarding the data, e.g., Bernoulli or Gaussian distributions, bounding, and so forth.

Additionally, these techniques may be incorporated as part of sequential hypothesis testing and thus may support greater efficiency in a determination of testing results, support real time "look in" as the testing is being performed, and so forth. As previously described, conventional testing is performed using a fixed-horizon hypothesis testing technique in which input parameters are first set to define a horizon. The horizon defines a number of samples (e.g., users visiting a website that are exposed to the items of digital marketing content) to be collected. The size of horizon is used to ensure that a sufficient number of samples are used to determine a "winner" within a confidence level of an error guarantee, e.g., to protect against false positives and false negatives. Examples of types of errors for which this guarantee may be applied include a Type I error (e.g., false positives) and a Type II error (e.g., false negatives) as previously described. As previously described, however, conventional fixed-horizon hypothesis testing techniques have several drawbacks including manual specification of a variety of input as a "best guess" that might not be well understood by a user and a requirement that the test is run until a horizon has been reached to attain accurate results, e.g., a set number of samples.

In contrast to conventional techniques that are based on a fixed horizon of samples, the described sequential hypothesis testing techniques involve testing sequences of increasingly larger number of samples until a winner is determined. In particular, the winner is determined based on whether a result of a statistic (e.g., a function of the observed samples) has reached a decision boundary, e.g., based on statistical significance that defines a confidence level in the accuracy of the results. Thus, statistical significance defines when it is safe to conclude the test, e.g., based on a level of confidence of a computed result (e.g., conversion) against defined amounts of Type I and/or Type II errors. This permits the sequential hypothesis testing technique to conclude as soon as a decision boundary is reached and a "winner" declared, without forcing a user to wait until the horizon "N" of a number of samples is reached.

This also permits the user to "peek" into the test to monitor the test in real time as it is being run, without affecting the accuracy of the test. Such a "peek" capability is not possible using fixed-horizon hypothesis testing as it influences results of the test. Flexible execution is also made possible in that the test may continue to run even if initial accuracy guarantees have been met, such as to obtain higher levels of accuracy, and even permits users to change parameters used to perform the test in real time as the test is performed, e.g., the accuracy levels. This is not possible using conventional fixed-horizon hypothesis testing techniques in which the accuracy levels are not changeable during the test because completion of the test to the horizon number of samples is required. Further discussion of these and other examples is included in the following sections.

Term Examples

In the following discussion, "digital content" refers to content that is shareable and storable digitally and thus may include a variety of types of content, such as documents, images, webpages, media, audio files, video files, and so on.

"Digital marketing content" refers to digital content provided to users related to marketing activities performed, such as to increase awareness of and conversion of products or services made available by a service provider, e.g., via a website. Accordingly, digital marketing content may take a variety of forms, such as emails, advertisements included in webpages, webpages themselves, and so forth.

"Binary" data refers to data limited to two options. "Continuous" data refers to data that is not limited to two options, e.g., may have more than two values such as monetary amounts and conversion rates.

"Conversion" refers to causation of a desired action as a result of exposure to a particular option that is measurable using a statistic, such as in response to digital marketing content. Examples of conversion include interaction of a user with the digital content (e.g., a "click-through"), purchase of a product or service that pertains to the digital content, and so forth. Conversion may be measured by a statistic in a variety of ways, such as binary values (e.g., did or did not convert), monetary amounts, conversion rate, and so forth.

"Fixed-horizon hypothesis testing" involves receipt of inputs manually from a user, and the test is then "run" over a defined number of samples (i.e., the "horizon") until it is completed. These inputs include a confidence level that refers to the probability of correctly accepting the null hypothesis, e.g., "1−Type I error" which is equal to "1−α". The inputs also include a power (i.e., statistical power) that defines a sensitivity in a hypothesis test that the test correctly rejects the null hypothesis, e.g., a false negative which may be defined "1−Type II error" which is equal to "1−β". The inputs further include a baseline conversion rate (e.g., "$\mu_A$") which is the metric being tested. A minimum detectable effect (MDE) is also entered as an input that defines a "lift" that can be detected with the specified power and defines a desirable degree of insensitivity as part of calculation of the confidence level.

A Type I error "α" is the probability of rejecting the null hypothesis when it is in fact correct, i.e., a "false positive."

A Type II error "β" is the probability of not rejecting the null hypothesis when it is in fact incorrect, i.e., a "false negative."

"Sequential hypothesis testing techniques" involve testing sequences of increasingly larger number of samples until a winner is determined. The winner is determined based on whether a result of a statistic has reached a decision boundary. Consequently, statistical significance defines when it is safe to conclude the test, e.g., based on a level of confidence of a computed result (e.g., conversion) against defined amounts of Type I and/or Type II errors.

A "Bernoulli distribution" is a probability distribution of a random variable which takes the value of one with success probability of "p" and the value of "0" with the failure probability of "q=1−p." It can be used to represent probabilities of two options, such as in a coin toss.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ testing techniques described herein. The illustrated environment 100 includes a service provider system 102, client device 104, marketing system 106, and source 108 of marketing data 110 (e.g., user interaction with digital content via respective computing devices) that are communicatively coupled, one to another, via a network 112. Although digital marketing content is described in the following, testing may be performed for a variety of other types of digital content, e.g., songs, articles, videos, and so forth, to determine "which is better" in relation to a variety of desired actions. These techniques are also applicable to testing of non-digital content, interaction with which being described using data that is then tested by the systems described herein.

Computing devices that are usable to implement the service provider system 102, client device 104, marketing system 106, and source 108 may be configured in a variety of ways. A computing device, for instance, may be configured as a desktop computer, a laptop computer, a mobile device (e.g., assuming a handheld configuration such as a tablet or mobile phone as illustrated), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 9.

The service provider system 102 is illustrated as including a service manager module 114 that is representative of functionality to provide services accessible via a network 112 that are usable to make products or services available to consumers. The service manager module 114, for instance, may expose a website or other functionality that is accessible via the network 112 by a communication module 116 of the client device 104. The communication module 116, for instance, may be configured as a browser, network-enabled application, and so on that obtains data from the service provider system 102 via the network 112. This data is employed by the communication module 116 to enable a user of the client device 104 to communicate with the service provider system 102 to obtain information about the products or services as well as purchase the products or services.

In order to promote the products or services, the service provider system 102 may employ a marketing system 106. Although functionality of the marketing system 106 is illustrated as separate from the service provider system 102, this functionality may also be incorporated as part of the service provider system 102, further divided among other entities, and so forth. The marketing system 106 includes a marketing manager module 118 that is implemented at least partially in hardware of a computing device to provide digital marketing content 120 for consumption by users, which is illustrated as stored in storage 122, in an attempt to cause conversion of products or services of the service provider system 102.

The digital marketing content 120 may assume a variety of forms, such as email 124, advertisements 126 (e.g., displayed in webpages or mobile applications), and so forth. The digital marketing content 120, for instance, may be provided as part of a digital marketing campaign 128 to the sources 108 of the marketing data 110. The marketing data 110 may then be generated based on the provision of the digital marketing content 120 to describe which users received which items of digital marketing content 120 (e.g., from particular marketing campaigns) as well as characteristics of the users. From this marketing data 110, the marketing manager module 118 may control which items of digital marketing content 120 are provided to a subsequent user, e.g., a user of client device 104, in order to increase a likelihood that the digital marketing content 120 is of interest to the subsequent user.

Part of the functionality usable to control provision of the digital marketing content 120 is represented as a testing system 130. The testing system 130 is representative of functionality implemented at least partially in hardware (e.g., a computing device) to test an effect of the digital marketing content 120 on achieving a desired action, e.g., a metric such as conversion of products or services of the service provider system 102.

The testing system 130, for instance, may estimate a resulting impact of different options of digital marketing content 120 on conversion of products or services of the service provider system 102, e.g., as part of A/B testing. A variety of techniques may be used by the testing system 130 to perform this estimation, an example of which is described in the following and shown in a corresponding figure. Although data (e.g., the marketing data 110) that describes user interaction with digital content is discussed in the following as an example, the data being tested may also be used to describe user interaction with non-digital content, such as physical products or services, which is then tested using the systems described herein.

Figure 2:
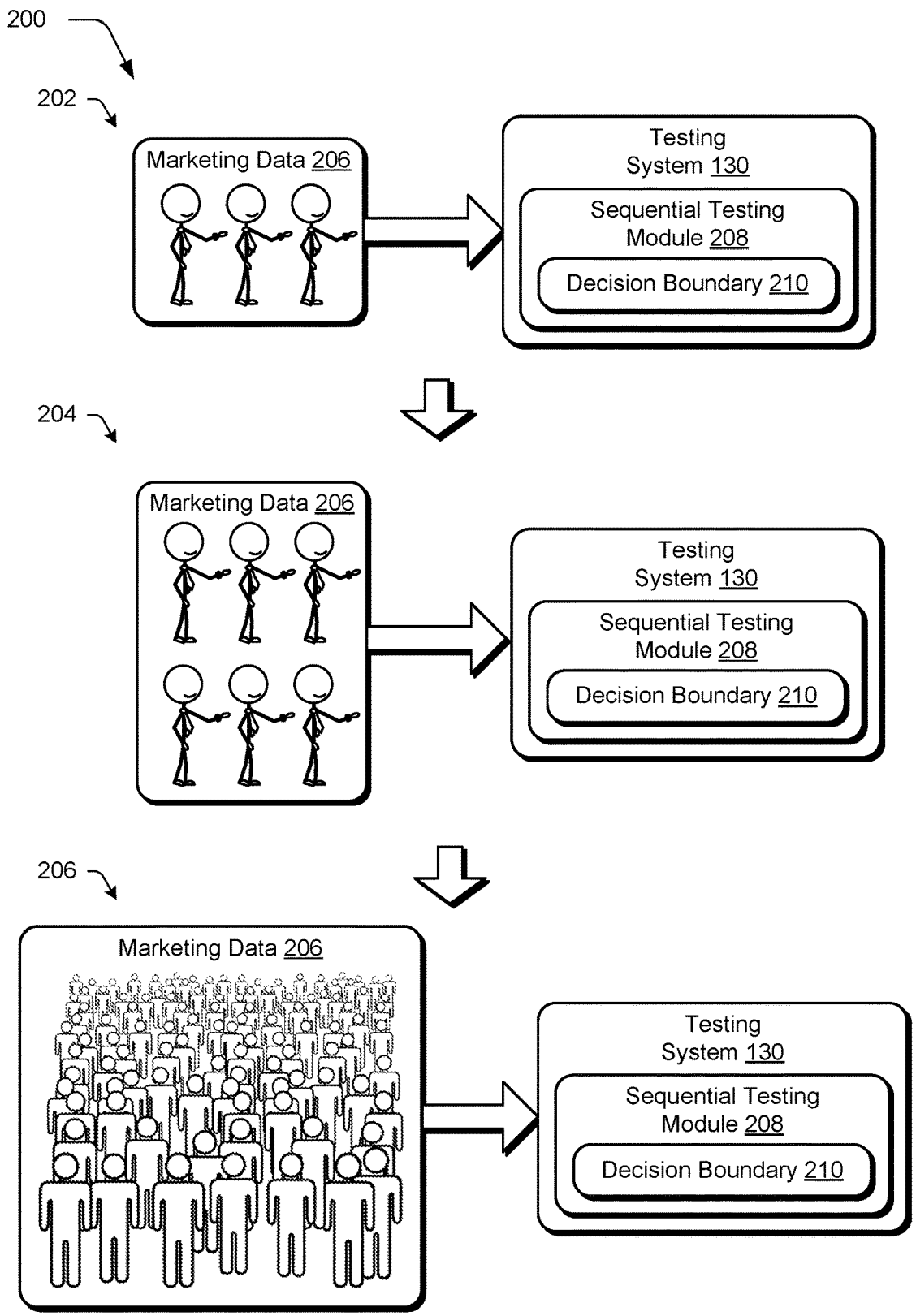
FIG. 2 depicts a system in an example implementation of sequential hypothesis testing.

FIG. 2 depicts a system 200 in an example implementation in which the testing system 130 of FIG. 1 is configured to perform sequential hypothesis testing. The system 200 is illustrated using first, second, and third stages 202, 204, 206. The testing system 130 in this example includes a sequential testing module 208. The sequential testing module 208 is implemented at least partially in hardware to perform sequential hypothesis testing to determine an effect of different options on a metric describing achievement of an action, e.g., conversion rate on achieving conversion. Continuing with the previous example, the sequential testing module 208 may collect marketing data 206 (which corresponds to marketing data 110) which describes interaction of a plurality of users via respective computing devices with digital marketing content 120. From this, an effect is determined of different items of digital marketing content 120 (e.g., items "A" and "B") on achievement of a desired action, e.g., conversion of a product or service being offered by the service provider system 102. Although two options are described in this example, sequential hypothesis testing may be performed for more than two options.

To perform sequential hypothesis testing, the sequential testing module 208 evaluates the marketing data 206 as it is received, e.g., in real time, to determine an effect of digital marketing content 120 on conversion. A decision boundary 210 (i.e., stopping rule) is then employed to determine when the testing may stop. The decision boundary 210, for instance, may be based at least partially on statistical significance. Statistical significance is used to define a point at which is it considered "safe" to consider the test completed, i.e., declare a result, and thus serves as a decision boundary 210 indicative of a point in time, at which, the testing may be safely completed. That is, a "safe" point of completion is safe with respect to an amount of false positives or false negatives permitted. This is performed in sequential hypothesis testing without setting the horizon "N" beforehand, which is required under the conventional fixed-horizon hypothesis testing. Thus, a result may be achieved faster and without requiring a user to provide inputs to determine this horizon.

The "sequence" referred to in sequential testing refers to a sequence of samples (e.g., the marketing data 206) that are collected and evaluated to determine whether statistical significance 210 has been reached. At the first stage 202, for instance, the sequential testing module 208 may collect marketing data 206 describing interaction of users with items "A" and "B" of the digital marketing content 120. The sequential testing module 208 then evaluates this marketing data 206 to compare groups of the users that have received item "A" with a group of the users that have received item "B," e.g., to determine a conversion rate exhibited by the different items. A decision boundary 210 (e.g., statistical significance) is also computed to determine whether it is "safe to stop the test" at this point, e.g., in order to reject the null hypothesis.

For example, a null hypothesis "$H_0$" is defined in which a conversion rate of the baseline is equal to a conversion rate of the alternative, i.e., "$H_0: A=B$". An alternative hypothesis "$H_1$" is also defined in which the conversion rate of the baseline is not equal to the conversion rate of the alternative, i.e., "$H_1: A \neq B$." Based on the response from these users described in the marketing data 206, a determination is made whether to reject or not reject the null hypothesis. Whether it is safe to make this determination is based on the decision boundary 210, which accounts for accuracy guarantees regarding Type I and Type II errors, e.g., to ninety-five percent confidence that these errors do not occur.

A Type I error "$\alpha$" is the probability of rejecting the null hypothesis when it is in fact correct, i.e., a false positive. A Type II error "$\beta$" is the probability of not rejecting the null hypothesis when it is in fact incorrect, i.e., a false negative. If the null hypothesis is rejected (i.e., a conversion rate of the baseline is equal to a conversion rate of the alternative) and is statistically significant (e.g., safe to stop), the sequential testing module 208 may cease operation as further described in greater detail below. Other examples are also contemplated in which operation continues as desired by a user, e.g., to achieve results with increased accuracy and thus promote flexible operation.

If the null hypothesis is not rejected (i.e., a conversion rate of the baseline is equal to a conversion rate of the alternative and/or it is not safe to stop), the sequential testing module 208 then collects additional marketing data 206 that describes interaction of additional users with items "A" and "B" of the digital marketing content 120. For example, the marketing data 206 collected at the second stage 204 may include marketing data 206 previously collected at the first stage 202 and thus expand a sample size, e.g., a number of users described in the data. This additional data may then be evaluated along with the previously collected data by the sequential testing module 208 to determine if the decision boundary 210 has been reached. If so, an indication may be output that it is "safe to stop" the test in a user interface. Testing may also continue as previously described or cease automatically.

If not, the testing continues as shown for the third stage 206 in which an even greater sample size is collected for addition to the previous samples until the decision boundary 210 is reached. In this way, once statistically significant results have been obtained, the process may stop without waiting to reach of predefined horizon "N" as required in conventional fixed-horizon hypothesis testing. This acts to conserve computational resources and results in greater efficiency, e.g., an outcome is determined in a lesser amount of time. Greater efficiency, for instance, may refer to an ability to fully deploy the winning option (e.g., the item of digital marketing content exhibiting the greatest conversion rate) at an earlier point in time. This increases a rate of conversion and reduces opportunity cost incurred as part of testing. For example, a losing option "A" may be replaced by the winning option "B" faster and thus promote an increase in the conversion rate sooner than by waiting to reach the horizon. In one example, increases in the sample size from the first, second, and third stages 202, 204, 206 is achieved through receipt of streaming data that describes these interactions.

Mathematically, the sequential testing module 208 accepts as inputs a confidence level (e.g., "1−Type I" error which is equal to "1−α") and a power (e.g., "1−Type II error" which is equal to "1−β"). The sequential testing module 208 then outputs results of a statistic "$\Lambda_n$," (e.g., a conversion rate) and a decision boundary 210 "$\gamma_n$," at each time "n." The sequential testing module 208 may thus continue to collect samples (e.g., of the marketing data 206), and rejects the null hypothesis $H_0$ as soon as "$\Lambda_n \geq \gamma_n$," i.e., the results of the statistic are statistically significant. Thus, in this example the testing may stop once the decision boundary 210 is reached. Other examples are also contemplated, in which the testing may continue as desired by a user, e.g., to increase an amount of an accuracy guarantee as described above.

Results of the sequential testing may be provided to a user in a variety of ways to monitor the test during and after performance of the test, which is not possible in conventional fixed horizon testing techniques. Further description of sequential hypothesis testing may be found at U.S. patent application Ser. No. 15/148,920, filed May 6, 2016, and titled "Sequential Hypothesis Testing in a Digital Medium Environment," the entire disclosure of which is hereby incorporated by reference.

Decision Boundary Determination

Figure 3:
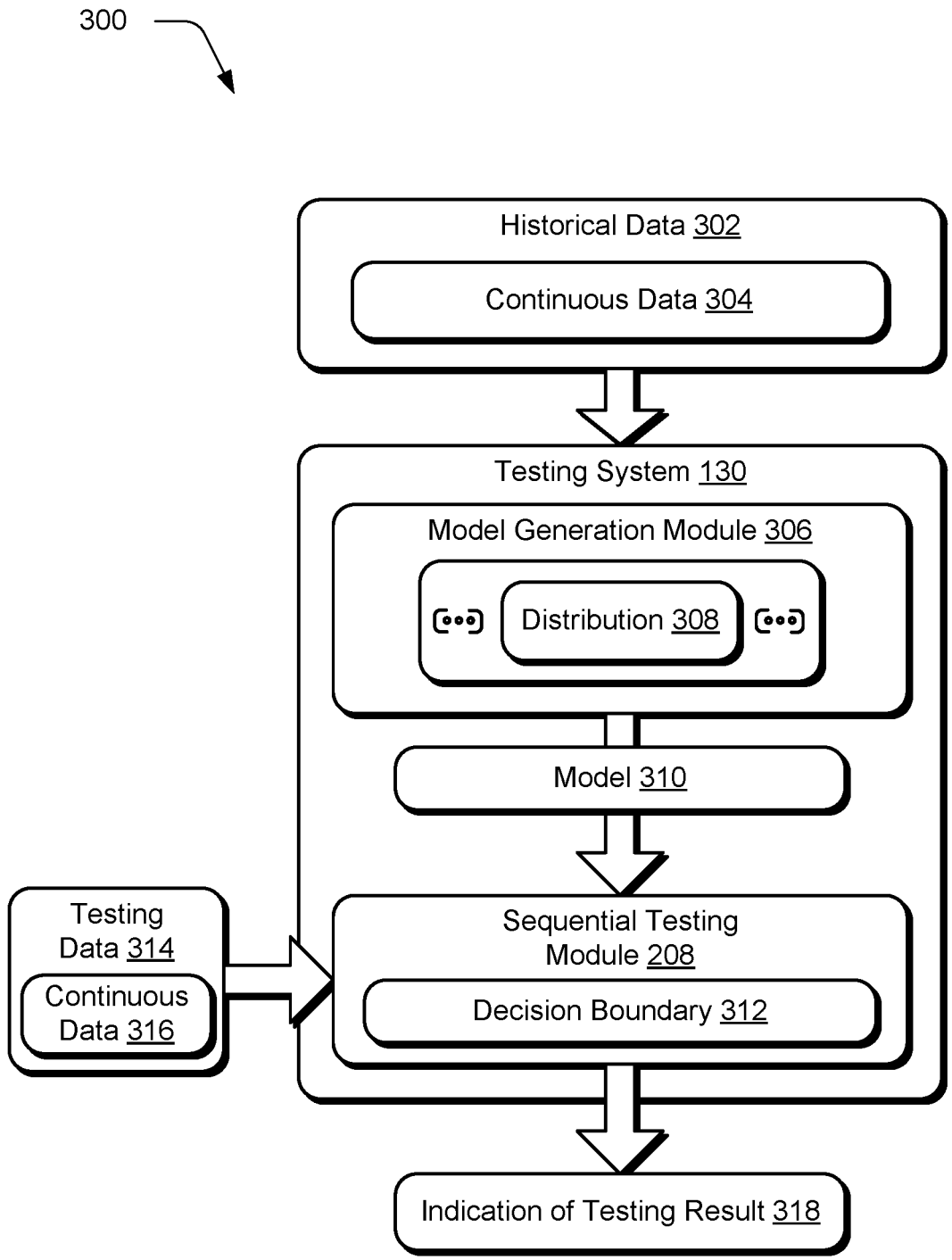
FIG. 3 depicts an example implementation in which a testing system of FIG. 1 uses at least one model identified through comparison with historical data to generate a decision boundary used as part of sequential hypothesis testing.
Figure 5:
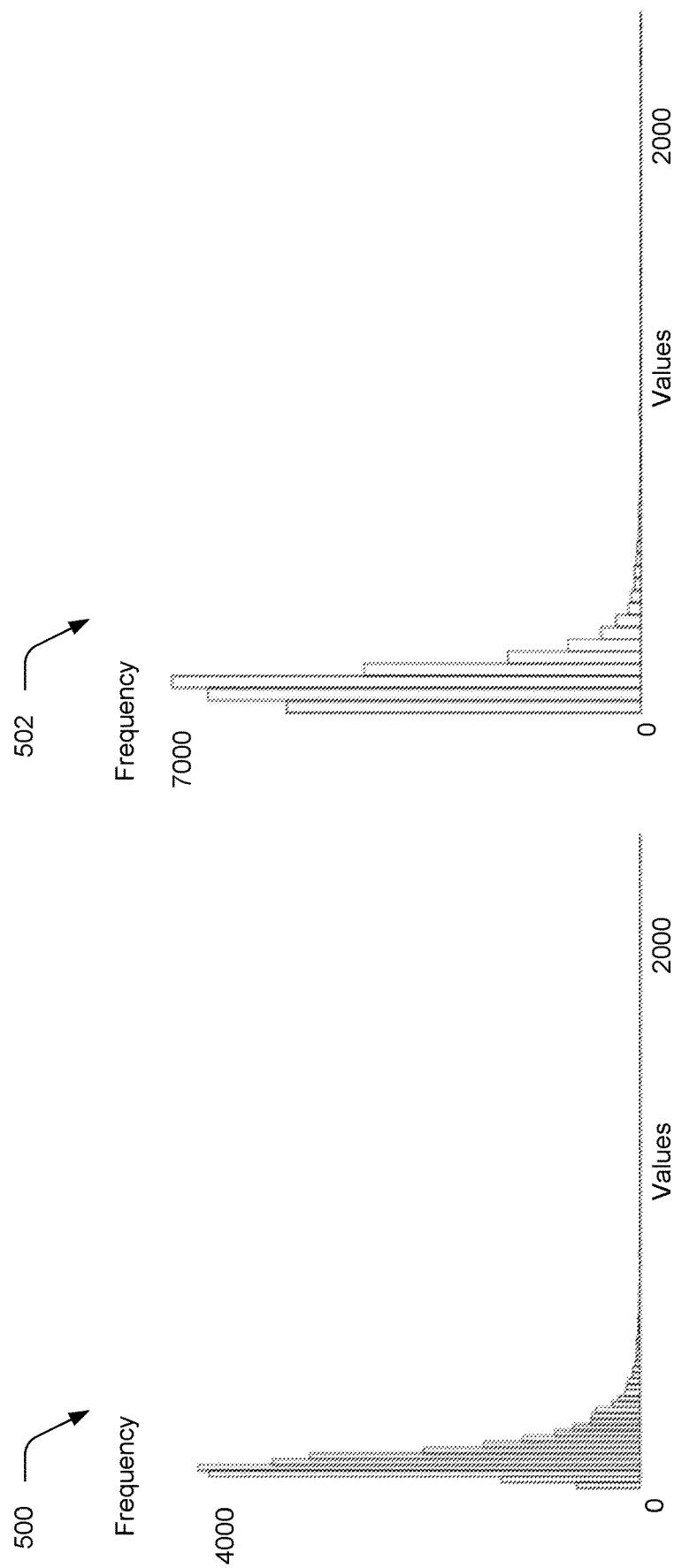
FIG. 5 depicts an example of distributions observed in the historical data that are usable to identify a plurality of sub models to form an ensemble model used to generate the decision boundary.

FIG. 3 depicts a system 300 and FIG. 4 depicts a procedure 400 in an example implementation in which the testing system 130 of FIG. 1 identifies at least one model through comparison with historical data for use in generating a decision boundary used as part of sequential hypothesis testing. FIG. 5 depicts an example of distributions 502, 504 observed in the historical data that are usable to identify a plurality of sub models to form an ensemble model used to generate the decision boundary.

Consider a scenario in which the testing system 130 is faced with two different options "A" and "B," from which the testing system 130 is tasked with determining which option has the highest expected reward towards achieving a desired action, such as conversion. At any point in time, a user is assigned to one of the alternatives "A" or "B," and a response is received from the user in the form of marketing data 110. The user, for instance, may access a website and then be exposed to one of the two options, may receive an email having either of the two options, and so forth. Marketing data 110 is then generated as a result of this exposure that describes achievement of the user in achieving the action as a result of exposure to a respective one of the options. The marketing data 110 may describe this achievement as a binary variable (e.g., clicking or not clicking on a link) or a continuous random variable, such as the amount of money spent as a result of interaction with digital marketing content 120 in dollars.

In the following, a scenario is described in which the marketing data 110 describes the effect towards achieving the desired action using continuous non-binary data. Continuous data includes data that is not limited to two options and thus supports more than two values, such as monetary amounts, conversion rates, and so forth. In such a scenario, options "A" and "B" have a mean value of "$m_A$" and "$m_B$," respectively. If a user is assigned option "A" (e.g., the user of the client device 104 interacts with a website and is exposed to digital marketing content 120 "A"), an observation of the following form is made:

$$X = m_A + w_A,$$

where "$w_A$" is a noise component associated with option "A." On the other hand, if a user is assigned option "B," the following observation is made:

$$Y = m + w_B$$

where "$w_B$" is a noise component associated with option "B."

The sequential testing module 208 is employed as previously described in relation to FIG. 2 to sequentially test a hypothesis that the two options have the same mean value. Mathematically, at any time "t," let "$\{X_i\}_{i=1}^{n_A'}$" and "$\{Y_i\}_{i=1}^{n_B'}$" represent the set of the data (i.e., marketing data 110) observed for options "A" and "B," respectively, where "$n_A'$" and "$n_B'$" are the number of observations for each option up until time "t." Based on this data, the null hypothesis "$H_0: m_A = m_B$" is accepted or rejected against the alternative hypothesis "$H_1: m_A \neq m_B$."

In this scenario, the type I error is defined as follows:

$$E_1 = \mathbb{P}[\text{reject } H_0 | H_0 \text{ is true}],$$

and the type II error is defined as follows:

$$E_2 = \mathbb{P}[\text{accept } H_0 | H_0 \text{ is false}].$$

Given the acceptable type I and II errors "α," "β," the sequential testing module 208 is configured to employ a sequential hypothesis testing technique which guarantees the following:

$$E_1 \leq \alpha, \ E_2 \leq \beta.$$

As previously described, fixed-horizon hypothesis testing techniques employ a stopping time (i.e., horizon), which is determined based on the Minimum Detectable Error (MDE, defined as $$\frac{|m_A - m_B|}{m_A}\Big),$$

and the test continues until that horizon is reached, i.e., a specified number of samples. It is only at that time where conclusions about the null hypothesis can be made, and no decision can be made before that, even if the data strongly suggests rejection/acceptance of the null hypothesis. However, the MDE is not known a priori (i.e., in a way based on theoretical deduction rather than empirical observation) and hence the horizon is generally set significantly higher than its optimal value to guarantee the desired error bounds in real world scenarios. Thus, the calculated horizon might have a large value (i.e., number of samples) which causes the test to continue until that value is reached. This can lead to tests that take a significant amount of time to perform and further no interactions can be made while the test is performed as previously described.

In a sequential hypothesis testing technique, however, the test may be completed as soon as the data strongly suggests rejection/acceptance of the null hypothesis as defined by a decision boundary. This can potentially lead to increased efficiency, e.g., faster stopping times, use of less computational resources, quicker deployment of the "winning" option, and so forth as described above. Furthermore, the sequential nature of this technique supports user interaction and real time output during performance of the test. For example, a dashboard can be shown to the user at any time summarizing what the data is currently indicates, and hence, whether it is considered safe (e.g., statistically significant) to stop the test based on this information.

Conventional sequential hypothesis testing techniques, however, are designed solely to handle binary data that follows a Bernoulli or Gaussian distribution. As such, these conventional techniques often fail for data that is not binary and does not follow a Bernoulli or Gaussian distribution, e.g., has a "heavy tail" as shown and further described in relation to FIG. 5. Accordingly, techniques are described in this section to identify a model of a likely distribution of data being tested. This likely distribution, as described by the model, is used to generate a decision boundary to test the data as part of a sequential hypothesis test as described in greater detail in the next section.

As shown in the system 300 of FIG. 3, for instance, historical data 302 is obtained that includes continuous data 304. In a digital marketing scenario, for instance, the historical data 302 may be configured as marketing data 110 that describes user interaction with different options of digital marketing content 102 and an effect of this interaction on achieving an action, e.g., conversion. Therefore, the continuous data 304 in this example quantifies a relative amount towards achieving this action, such as through use of a monetary amount (e.g., a monetary amount of products or services purchased as a result of this interaction), a conversion rate, and so forth. This historical data 302 is used to identify a distribution exhibited by the historical data 302 for testing subsequent data, e.g., testing data 314.

This historical data 302, having the continuous data 304, is first processed by a model generation module 306. The model generation module 306 is implemented at least partially in hardware of a computing device (e.g., processing system and memory) to aid identification of one or more distributions 308 exhibited by the continuous data 304 to generate a model 310 that likely defines how the historical data 302 relates towards achievement of the action. This may be performed to support manual interaction by a user or automatically by the model generation module 306 itself.

For example, the model generation module 306 may be configured to output the continuous data 304 in a user interface such that a distribution of the continuous data 304 is exposed to a user. The user may then select from a plurality of distributions 308 (e.g., output in the user interface) to fit one or more predefined distributions to a distribution observed from the continuous data 304. In another example, the model generation module 306 itself selects from one or more predefined distributions 308 automatically and without user intervention for generate the model 310 that best describes the continuous data 304. The model generation module 306, for instance, may fit different combinations of the distributions 308 to arrive at a combination that describes a distribution exhibited by the continuous data 304.

The model 310 is then received as an input by the sequential testing module 208 of FIG. 2. The sequential testing module 208 employs the model 310 to determine a decision boundary 312 for performing a sequential hypothesis test of subsequent testing data 314 having continuous data 316 that is likely similar to the historical data 302, i.e., generated in the same manner In this way, generation of the model 310 based on the historical data 302 may be used to test subsequent testing data 314 that is likely to follow the model 310. An indication of a testing result 318 may then be output, such as in real time in a user interface as the testing is being performed which is not possible using conventional techniques as previously described in relation to FIG. 2.

In one example, historical data 302 is generated by cleaning and filtering one thousand different tests to form a set of one hundred and fifty tests, e.g., based on size of collected data and an amount of time to process the data. From this, an observation is made through use of the model generation module 306 that the continuous data 304 results in tests having two types of distributions, either a Log-Normal distribution 502 or a mixture of Log-Normal and a mass at zero distribution 504. For example, a user may view the distributions in a user interface and from this select a distribution or combination of distributions which best match the observed distribution in the historical data 302. Also, in this example it is known a priori that the data obtains only non-negative values because the continuous data 304 represents monetary amounts, e.g., dollar values.

Accordingly, in this example, the model generation module 306 generates an ensemble model (e.g., mixture model) as formed as a mixture of a plurality of sub-models based on distributions of the effect of the user interactions described by historical data 302 (block 402). For example, the data observed for option "A" may be modeled as the following ensemble model as follows:

$$X = \begin{cases} 0 & \text{with probability } p_A \\ Z_A & \text{with probability } 1-p_A, \end{cases}$$

where "$Z_A \sim LN(\mu_A, \sigma_A^2)$" defines Log-Normal random variables with parameters "$\mu_A$" and "$\sigma_A^2$." Thus, the data observed for option "A" follows a mixture distribution with parameters ($p_A$, $\mu_A$, $\sigma_A^2$) which are unknown and are estimated based on the data. Further, the mean value of option "A" is given by:

$$m_A = (1-p_A)e^{\mu_A + \frac{\sigma_A^2}{2}},$$

and the variance of the outcomes for option "A" is:

$$v_A = (1-p_A)(e^{\sigma_A^2}-1)e^{2\mu_A + \sigma_A^2}.$$

Similarly, the data observed for option "B" may be modeled as the same mixture model with parameters ($p_B$, $\mu_B$, $\sigma_B^2$), in which:

$$X = \begin{cases} 0 & \text{with probability } p_B \\ Z_B & \text{with probability } 1-p_B, \end{cases}$$

where "$Z_B \sim LN(\mu_B, \sigma_B^2)$," and the mean and variance associated to option "B" are given by $$m_B = (1-p_B)e^{\mu_B + \frac{\sigma_B^2}{2}},$$

and $$v_B = (1-p_B)\left(e^{\sigma_B^2}-1\right)e^{2\mu_B + \sigma_B^2}.$$

A sequential testing module 208 is then employed to control sequential hypothesis testing of an effect of the plurality of options on achieving the action in testing data based on the model (block 404). In this way, the sequential testing module 208 may be adapted for use with data having different distributions as further described in the following section.

Sequential Hypothesis Testing

Figure 6:
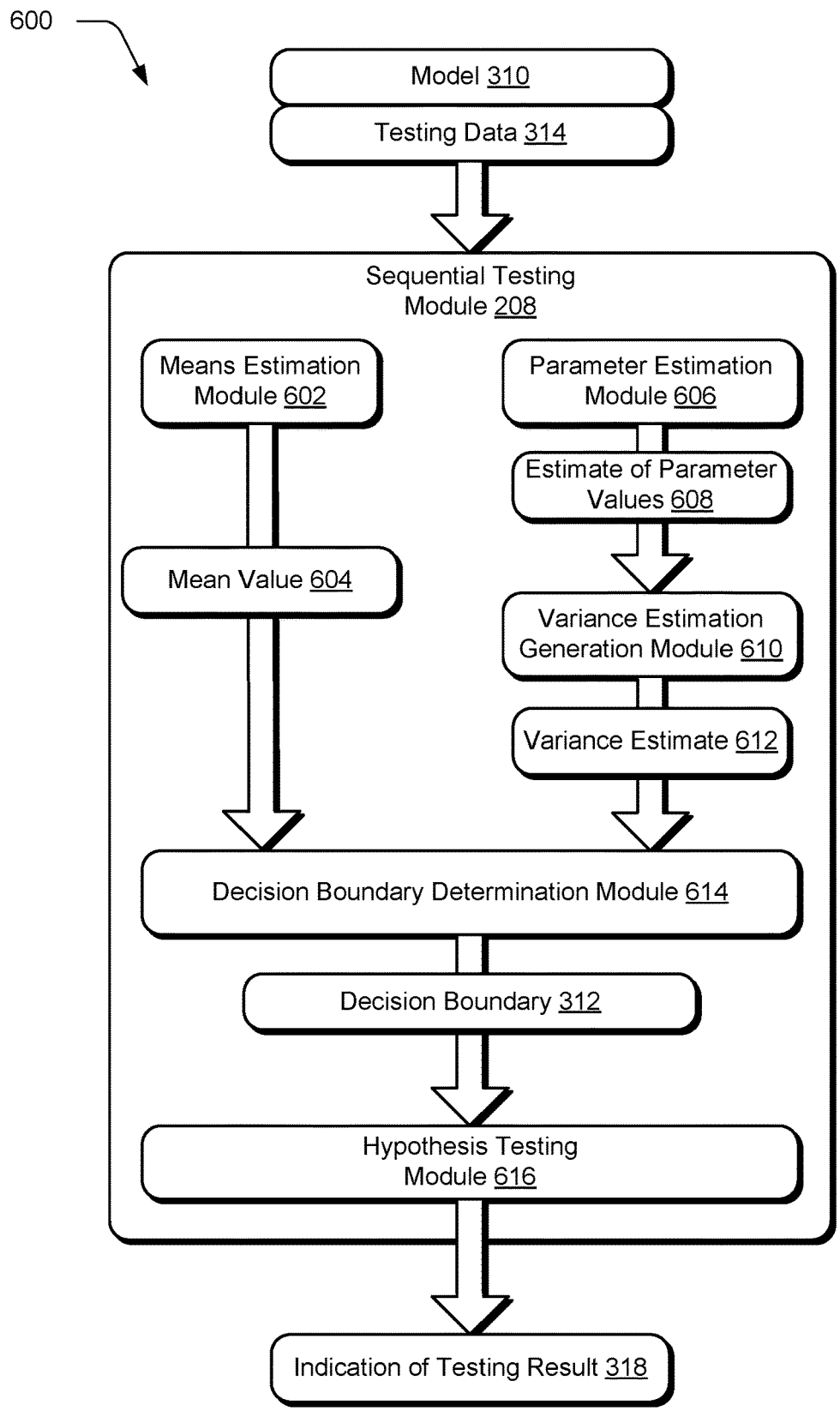
FIG. 6 depicts a system in which a model generated in FIGS. 3 and 4 is used to estimate a decision boundary for use a part of sequential hypothesis testing.
Figure 7:
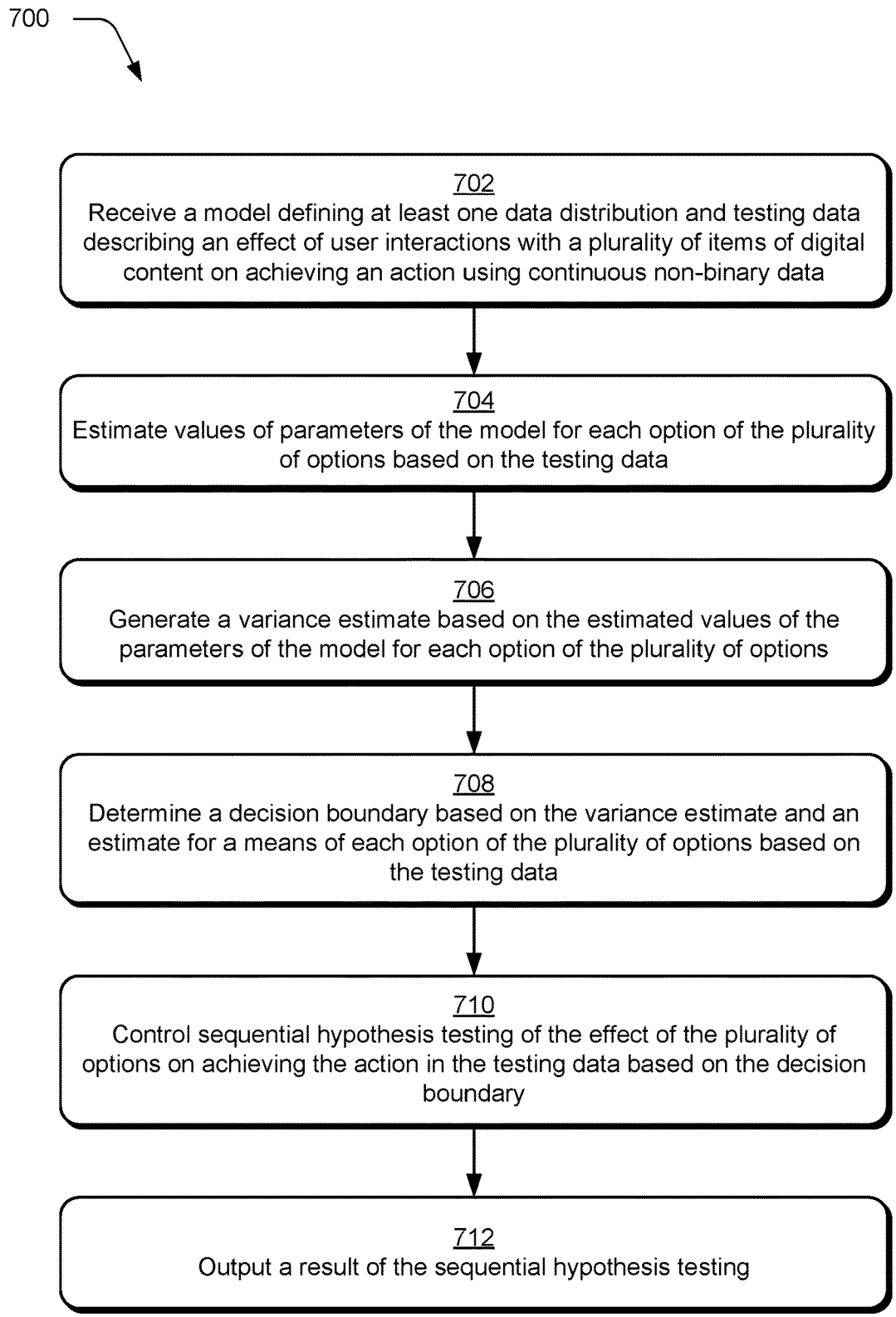
FIG. 7 depicts a procedure in an example implementation in which a decision boundary is estimated for use a part of sequential hypothesis testing using the model of FIGS. 3 and 4.

FIG. 6 depicts a system 600 and FIG. 7 depicts a procedure 700 in an example implementation in which the model generated in FIGS. 3 and 4 is used to estimate a decision boundary for use a part of sequential hypothesis testing. FIG. 8 depicts an example parametric technique 800 for performing sequential hypothesis testing.

To begin, the sequential testing module 208 receives a model 310 defining at least one data distribution, e.g., the log normal distribution and a mass-at-zero distribution. Testing data 314 is also received that describes an effect of user interactions with the plurality of options of digital content on achieving the action using continuous non-binary data (block 702). A means estimation module 602 is then implemented to estimate a mean value 604 for each option of the plurality of options described in the testing data 314. In one example, this is performed using an empirical technique that is based on a central limit theorem (CLT). In probability theory, a central limit theorem specifies that when independent random variables are added, a sum of these variables tends toward a normal distribution (e.g., a bell curve) even if the original variables themselves are not normally distributed.

This technique to calculate a mean value 604 is also typically employed as part of conventional sequential hypothesis testing techniques for binary data having a Gaussian distribution. For example, in conventional techniques at time "t" after a warm up phase (where no decision is made and only data is collected) the following operations may be performed as part of sequential hypothesis testing:

1. Compute the empirical mean value of each population:

$$\hat{m}_A^t = \frac{1}{n_A^t}\sum_{i=1}^{n_A^t} X_i, \hat{m}_B^t = \frac{1}{n_B^t}\sum_{i=1}^{n_B^t} Y_i.$$

2. Compute an empirical variance of each population:

$$\hat{v}_A^t = \frac{1}{n_A^t}\sum_{i=1}^{n_A^t}(X_i - \hat{m}_A)^2, \hat{v}_B^t = \frac{1}{n_B^t}\sum_{i=1}^{n_B^t}(Y_i - \hat{m}_B)^2.$$

3. Let $$\hat{V}_t = \frac{\hat{v}_A}{n_A^t} + \frac{\hat{v}_B}{n_B^t} \theta_t = |\hat{m}_A - \hat{m}_B|.$$

4. Stop and reject the null hypothesis if $$\theta_t > \sqrt{\left(2\log\frac{1}{\alpha} - \log\frac{\hat{V}_t}{\hat{V}_t + \tau}\right)\frac{\hat{V}_t(\hat{V}_t + \tau)}{\tau}}.$$

In the last step, "$\tau$" is a free parameter that is tuned that represents variance of a prior distribution on a gap, which is a different between the two mean values for the two options. Testing continues, conventionally, until a predetermined horizon "$N_{max}$" is reached and the null hypothesis is accepted if the decision boundary 312 has not been rejected, e.g., to prevent calculation in perpetuity. However, as previously described this technique may be limited and prone to error for distributions that do not follow this distribution.

Accordingly, the sequential testing module 208 in this example is configured to take into account other distributions that may be exhibited by the testing data 314 through use of the identified model 310 of the previous section. The model 310, for instance, may be an ensemble (e.g., mixture) model formed from sub-models of a log normal distribution and a mass-at-zero distribution. In this instance, this is based on the asymptotic normality of maximum likelihood estimates as further described below in greater detail.

At a high level, the sequential testing module 208 in this example is configured to replace the empirical variances computed in the empirical technique (i.e., in accordance with the central limit theorem) above with a "plug-in" estimate for values of each option being tested for the variance. For example, a parameter estimation module 606 is first employed to estimate values of parameters for each option of the plurality of options in the testing data 314 (block 704). A variance estimate is then generated based on the estimated values of the parameters of the model for each option of the plurality of options (block 706).

Continuing with the previous example, generation of the "plug-in" estimate first involves computing maximum likelihood (ML) estimates by the parameter estimation module 606 of values of the parameters (p, μ, σ²) 608 of each option (e.g., "A" or "B"). The techniques described above for the ensemble (e.g., mixture) model are then used by a variance estimation generation module 610 to compute a variance estimate 612 for the ensemble model of the log normal distribution and a mass-at-zero distribution. The asymptotic theory of the ML estimates then leads to the same decision boundary with a new variance estimates.

In this example, the plug-in estimate for the means is not utilized but rather an empirical estimate for the means is used for the mean value 604 as described above. This is because the techniques are reliant on the testing data 314 to estimate the parameters and as such errors in mean and variance estimates might destructively add up and degrade the performance.

Accordingly, the ML estimate of the parameters of each option (A, B) is only used to derive an estimate of the variance of that option. Details and successive steps are summarized in the algorithm 800 of FIG. 8. Given a data set "$\mathcal{D}_A$" of observations for option "A," let "$(\hat{p}_A, \hat{\mu}_A, \hat{\sigma}_A^2)=ML(\mathcal{D}_A)$" represent the ML estimates for the parameters "(pA, μ_A, σ_A²)" defined as follows:

$$\hat{p}_A = \frac{1}{n_A}\sum_{X \in \mathcal{D}_A} \mathcal{I}(X = 0)$$

$$\hat{\mu}_A = \frac{\sum_{X \in \mathcal{D}_A, X \neq 0} \log(X)}{\sum_{X \in \mathcal{D}_A, X \neq 0} 1}$$

$$\hat{\sigma}_A^2 = \frac{\sum_{X \in \mathcal{D}_A, X \neq 0} (\log(X) - \hat{\mu}_A)^2}{\sum_{X \in \mathcal{D}_A, X \neq 0} 1},$$

where "$\mathcal{I}$" is an indicator function and "$n_A$" represents the number of elements in "$\mathcal{D}_A$." Similarly, "let ($\hat{p}_B$, $\hat{\mu}_B$, $\hat{\sigma}_B^2) = \text{ML}(\mathcal{D}_B)$" denote the ML estimates of the parameters of option "B," given a data set "$\mathcal{D}_B$" defined as follows:

$$\hat{p}_B = \frac{1}{n_B} \sum_{Y \in \mathcal{D}_B} I(Y = 0)$$

$$\hat{\mu}_B = \frac{\sum_{Y \in \mathcal{D}_B, Y \neq 0} \log(Y)}{\sum_{Y \in \mathcal{D}_B, Y \neq 0} 1}$$

$$\hat{\sigma}_B^2 = \frac{\sum_{Y \in \mathcal{D}_B, Y \neq 0} (\log(Y) - \hat{\mu}_B)^2}{\sum_{Y \in \mathcal{D}_B, Y \neq 0} 1}$$

The variance estimate 612 along with the mean value 604 are then used by a decision boundary determination module 614 of each option of the plurality of options to determinate a decision boundary 312 for the testing data 314 (block 708). As previously described, the mean value 604 and the variance estimate 612 may be used to determine "when it is safe" to stop sequential hypothesis testing, e.g., that statistical significance has been reached as described in relation to FIG. 2. For example, the decision boundary 312 may be configured using a gap based technique, in which the gap is a difference between the two mean values for the two options subject to the variance. Sequential hypothesis testing of the effect of the plurality of options on achieving the action in the testing data is then controlled based on the decision boundary (block 710) and a result is output (block 712), e.g., in a user interface, stored in storage of a computing device, and so forth.

Performance of the testing system 130 was evaluated using a real world data set. In that data set, a digital marketing campaign 128 is selected with "$m_A = 58.3$" and "$m_B = 57$" which corresponds to a lift of 2.14%. Also, the digital marketing campaign 128 was held for twenty days resulting in a total of 273,000 data points. By selecting "$\tau = 0.1$" (e.g., a tuning value that represents variance of a distribution exhibited by the testing data on a gap as a difference between the mean values of each option of the plurality of options as defined by the decision boundary as described in further detail below), the testing system 130 correctly rejects the null hypothesis (i.e., declare that $m_A$ and $m_B$ are unequal) after 78,000 total observations. Selecting "$\tau = 1$" reduces the total observations (before rejecting the null hypothesis) to 20,000. This is compared to a conventional fixed-horizon continuous A/B test that required a total of 93,000 data points to conclude if the MDE is set to 2% (i.e., with an accurate estimate of the MDE). Also recall that this conventional technique assumes the data is normally distributed and hence, its results are highly suspect and may be unreliable. This indicates the reliability and data-efficiency of the testing system 130 in real-world situations. Additional testing has shown that the testing system 130 is capable of guaranteeing a desired type II error with a relatively small amount of data.

The tuning parameter "$\tau$" may be automatically selected by the testing system 130 based on the data. With this automatic selection, there is no extra tuning required for testing system and thus supports use by users that are not sophisticated in operation of the testing system 130. The tuning parameter "$\tau$" is used in determining the decision boundary 312 and from theoretical point of view, it represents the variance of a prior distribution on a gap, i.e., the difference between the two means. Therefore, the value of the tuning parameter is set to "$\tau = O((\hat{m}_a - \hat{m}_B)^2)$" after a warm up phase is finished. For example, if "$(\hat{m}_a - \hat{m}_B)^2 = 8.5$" after the warm up phase, a value of "$\tau = 10$" is chosen and if "$(\hat{m}_a - \hat{m}_B)^2 = 0.8$" after the warm up phase, a value of "$\tau = 1$" is chosen.

In order to evaluate the type I error of the testing system 130 on real-world data, another campaign is selected from the data set and the data of option A is replicated such that two exactly identical data sets for options "A" and "B" are obtained. In this case, conventional fixed horizon hypothesis testing requires a total of 76,000 observations to conclude the test and presumably accept the null hypothesis. Through use of automatic selection of "$\tau$" and for a horizon of "$N_{max} = 76000$" and a warm up phase of 15,000 data per option results in a type 1 error of 6% which is within our acceptable type I error region ($\alpha = 10\%$). This shows that the testing system 130 is also capable of achieving the desired type I error on the real world data.

Example System and Device

Figure 9:
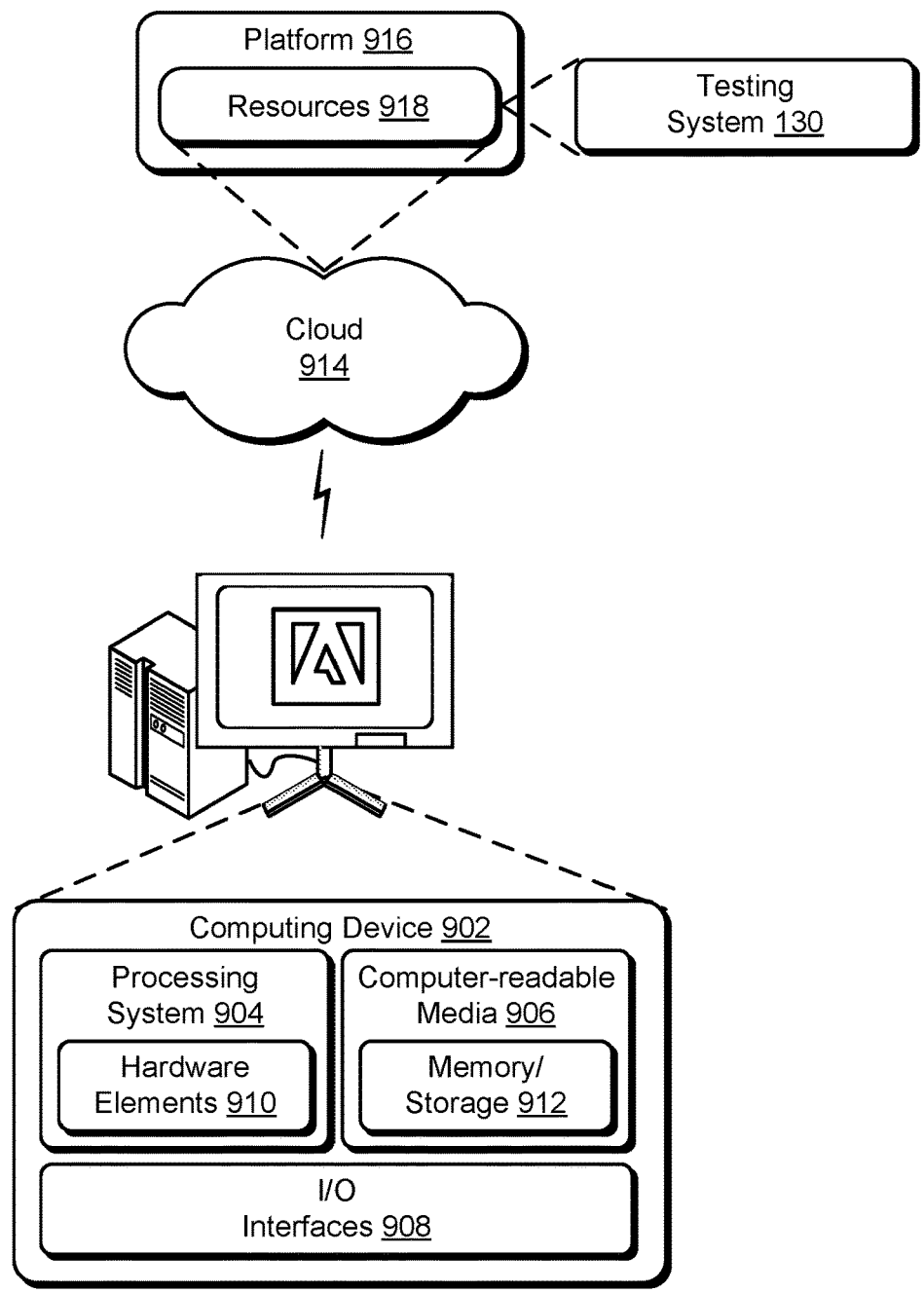
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the testing system 130. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
at least one computing device implementing model generation to generate an ensemble model as including a plurality of sub-models based on distributions of effects of user interactions described by historical data, the historical data describing the effect of the user interactions with a plurality of options of digital content on achieving an action using continuous non-binary data, the plurality of options being provided on computing devices allowing for the user interactions;
determining at least one decision boundary based upon selecting at least one of a plurality of predefined distributions that at least partially fit at least one of the distributions of effects; and
the at least one computing device implementing sequential hypothesis testing of an effect of the plurality of options on achieving the action in testing data based on the ensemble model, the sequential hypothesis being at least partially controlled based on the at least one decision boundary.

2. The system as described in claim 1, wherein the model generation is configured to generate a tuning value, automatically and without user intervention, that represents variance of a distribution exhibited by the testing data.

3. The system as described in claim 2, wherein the tuning value is based on a gap as a difference between mean values of each option of the plurality of options as defined by a decision boundary.

4. The system as described in claim 1, wherein the sequential testing is configured to:
collect a sample in a sequence of samples from the testing data;
establish, for the collected sample, the effect of the plurality of options on achieving the action;
determine whether the decision boundary has been met for the effect of the plurality of options on achieving the action; and
generate at least one indication of the sequential hypothesis testing as performed in real time based on the established effect and the decision boundary.

5. The system as described in claim 4, wherein the decision boundary is based at least in part on an amount of a Type I error that defines a probability of a false positive.

6. The system as described in claim 1, wherein the continuous non-binary data describes a conversion rate and monetary amount.

7. A method comprising:
generating, by a computing device, an ensemble model as including a plurality of sub-models based on distributions of effects of user interactions described by historical data, the historical data describing the effect of the user interactions with a plurality of options of digital content on achieving an action using continuous non-binary data, the plurality of options being provided on computing devices allowing for the user interactions;
determining at least one decision boundary based upon selecting at least one of a plurality of predefined distributions that at least partially fit at least one of the distributions of effects; and
controlling, by the computing device, sequential hypothesis testing of an effect of the plurality of options on achieving the action in testing data based on the ensemble model, the sequential hypothesis being at least partially controlled based on the at least one decision boundary.

8. The method as described in claim 7, wherein generating includes generating a tuning value, automatically and without user intervention, that represents variance of a distribution exhibited by the testing data.

9. The method as described in claim 8, wherein the tuning value is based on a gap as a difference between mean values of each option of the plurality of options as defined by a decision boundary.

10. The method as described in claim 7, wherein the controlling includes:
collecting a sample in a sequence of samples from the testing data;
establishing, for the collected sample, the effect of the plurality of options on achieving the action;
determining whether the decision boundary has been met for the effect of the plurality of options on achieving the action; and
generating at least one indication of the sequential hypothesis testing as performed in real time based on the established effect and the decision boundary.

11. The method as described in claim 10, wherein the decision boundary is based at least in part on an amount of a Type I error that defines a probability of a false positive.

12. The method as described in claim 7, wherein the continuous non-binary data describes a conversion rate or monetary amount.

13. A system comprising:
at least one computing device implementing model generation to generate an ensemble model as including a plurality of sub-models based on distributions of effects of user interactions described by historical data, the historical data describing the effect of the user interactions with a plurality of options of digital content on achieving an action using continuous non-binary data, the plurality of options being provided on computing devices allowing for the user interactions, the model generation configured to generate a tuning value that is based on a gap as a difference between mean values of each option of the plurality of options as defined by a decision boundary; and
the at least one computing device implementing sequential hypothesis testing of an effect of the plurality of options on achieving the action in testing data based on the ensemble model.

14. The system as described in claim 13, wherein the plurality of sub-models includes a log normal distribution and a mass-at-zero distribution.

15. The system as described in claim 13, wherein the sequential testing is configured to:
collect a sample in a sequence of samples from the testing data;
establish, for the collected sample, the effect of the plurality of options on achieving the action;
determine whether the decision boundary has been met for the effect of the plurality of options on achieving the action; and
generate at least one indication of the sequential hypothesis testing as performed in real time based on the established effect and the decision boundary.

16. The system as described in claim 15 wherein the decision boundary is based at least in part on an amount of a Type I error that defines a probability of a false positive.

17. The system as described in claim 13, wherein the continuous non-binary data describes a conversion rate and monetary amount.

18. The system as described in claim 13, wherein the tuning value is generated automatically and without user intervention.

19. The system as described in claim 1, wherein the selecting at least one of plurality of predefined distributions include combining predefined distributions.

20. The system as described in claim 7, wherein the selecting at least one of plurality of predefined distributions include combining predefined distributions.

* * * * *